United States Patent [19]
Uzelmeier et al.

[11] 3,971,834

[45] July 27, 1976

[54] MODIFIED ACRYLATE RESIN

[75] Inventors: Christopher W. Uzelmeier, Laurel Springs; Paul D. Jones, Cherry Hill, both of N.J.

[73] Assignee: Shell Oil Company, Houston, Tex.

[22] Filed: Mar. 27, 1975

[21] Appl. No.: 562,513

[52] U.S. Cl. ................... 260/837 R; 204/159.16; 260/836; 428/418
[51] Int. Cl.² ........................................ C08L 63/02
[58] Field of Search .................... 260/836, 837 R

[56] References Cited
UNITED STATES PATENTS

| | | |
|---|---|---|
| 3,179,714 | 4/1965 | Brockman et al. ............... 260/837 R |
| 3,676,524 | 7/1972 | Takiyama et al. ............... 260/837 R |
| 3,720,592 | 3/1973 | Mani .............................. 260/837 R |
| 3,882,187 | 5/1975 | Takiyama et al. ............... 260/837 R |

*Primary Examiner*—Harry Wong, Jr.

[57] ABSTRACT

A modified photocurable acrylate resin with improved adhesion to metals is prepared by reacting a liquid polyepoxide, an ethylenically unsaturated conjugated organic carboxylic acid, and a secondary monoamine.

6 Claims, No Drawings

MODIFIED ACRYLATE RESIN

BACKGROUND OF THE INVENTION

This invention relates to an improved resin composition. More particularly, this invention relates to a modified photocurable acrylate resin with improved adhesion to metals. Specifically, the invention discloses a photocurable resin prepared by contacting a polyepoxide, an ethylenically saturated conjugated organic carboxylic acid, and a secondary monoamine.

THE PRIOR ART

Cured polyepoxides have many desirable properties such as solvent and chemical resistance, and there has been an increasing desire to transfer many of these desirable properties over to the conventional polyester type products. This transfer is typically accomplished by reacting the polyepoxides with an unsaturated monocarboxylic acid, such as, for example, acrylic acid. The products prepared in this manner can be cured to form products having the desired characteristics of the polyepoxides as well as those of the unsaturated polyesters. A valuable product of this type, for example, can be obtained by reacting a glycidyl polyether of 2,2-bis(4-hydroxyphenyl)propane with acrylic acid. Such product can be represented by the following formula:

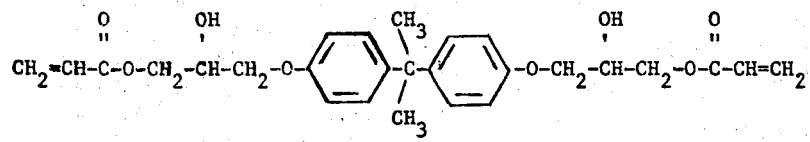

The hydroxy-substituted unsaturated polyesters of the above type, however, have certain undesirable properties which have limited their use in industrial coatings. For example, light-cured films obtained from these polyesters do not have acceptable adhesion to metal surface characteristics.

One approach to improve the adhesion characteristics of polyesters is taught in British Patent No. 1,360,910. In the British patent an epoxy compound is reacted with an unsaturated monocarboxylic acid and a saturated or unsaturated alkyd resin with 1–4 terminal carboxyl groups to form an unsaturated epoxy-ester resin which is cured by electron bean irradiation. However, the method taught in the British patent often produces resins that are too viscous for some application. Another method to improve adhesion is disclosed in our copending application entitled "Modified Acrylate Resin", Ser. No. 559,183, filed Mar. 17, 1975 wherein a polyepoxide is reacted with a carboxylic acid and the half ester of an aliphatic monohydric alcohol and a polycarboxylic acid anhydride. It has now been found that the adhesion characteristics of certain UV-curable acrylate resin compositions are also improved by replacing a specified percentate of the acrylate-type acid reactant with a secondary monoamine.

SUMMARY OF THE INVENTION

The present invention discloses a curable resin composition and the method for making the same, wherein the curable resin is prepared by contacting a liquid polyepoxide with a secondary monoamine and with an ethylenically unsaturated conjugated organic carboxylic acid.

DETAILED DESCRIPTION OF THE INVENTION

The curable resin composition is prepared by contacting a secondary monoamine, an ethylenically unsaturated conjugated organic carboxylic acid and a polyepoxide in a ratio of between about 0.2 and about 0.9 chemical equivalents of the secondary monoamine per chemical equivalent of the polyepoxide and between about 0.8 and about 0.1 chemical equivalents of the carboxylic acid per chemical equivalent of the polyepoxide. The theorized structure obtained by contacting one mole of the diglycidyl ether of 2,2-bis(4-hydroxyphenyl)propane (2 chemical equivalents) with one mole of diisopropanolamine (1 chemical equivalent) and one mole of acrylic acid (1 chemical equivalent) is as follows:

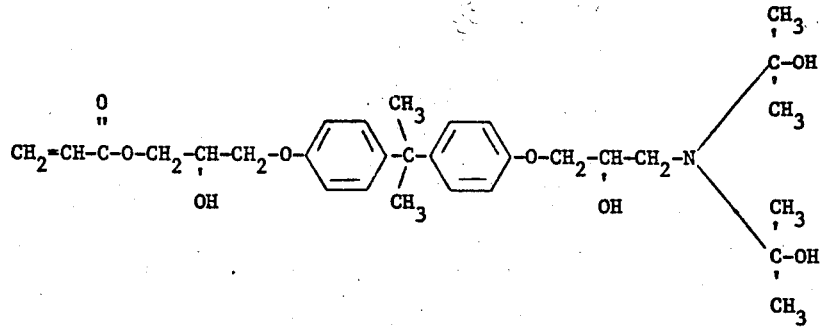

THE POLYEPOXIDES

The liquid polyepoxides employed in the present invention include those compounds possessing one or more vic-epoxy groups, i.e., one or more

groups. These polyepoxides are saturated or unsaturated, aliphatic, cycloaliphatic, aromatic or heterocyclic, and are substituted, if desired, with non-interfering substituents, such as halogen atoms, hydroxyl groups, ether radicals, and the like. Polyepoxides employed are monomeric or polymeric. Preferred liquid polyepoxides include the so-called liquid glycidyl polyethers of polyhydric phenols and polyhydric alcohols. Especially preferred are the glycidyl polyethers of 2,2-bis(4-hydroxyphenol)propane having an average molecular weight between about 300 and about 900 and an epoxide equivalent weight of between about 140 and about 500.

Various examples of polyepoxides that may be used in this invention are given in U.S. Pat. No. 3,408,422 (columns 3,4 and 5) and it is to be understood that so much of the disclosure of that patent relative to examples of polyepoxides is incorporated by reference into this specification.

THE ETHYLENICALLY UNSATURATED CONJUGATED ORGANIC CARBOXYLIC ACIDS

The ethylenically unsaturated conjugated organic carboxylic acids employed include aliphatic, cycloaliphatic, and aromatic acids and also include mono-carboxylic and poly-carboxylic acids. The term "conjugated" refers to the relative location of the unsaturation linkage and the carboxyl group. Examples of the acids to be utilized include acrylic acid, methacrylic acid, cyclohexane carboxylic acid, maleic acid, crotonic acid, alphaphenylacrylic acid, tetrahydrophthalic acid, 2,4-octadiene-carboxylic acid, 2,4-dodecadienoic acid and the like. Preferred are the unsaturated aliphatic conjugated monocarboxylic acids of from 3 to about 10 carbon atoms. More preferred acids are acrylic acid and methacrylic acid. Especially preferred is acrylic acid.

THE SECONDARY MONOAMINES

Acceptable amines for use in the invention are those monoamines having one and only one active hydrogen directly attached to a single nitrogen atom — that is, secondary monofunctional amines. Difunctional amines are not suitable since if difunctional amines are reacted with difunctional epoxides, an excessively high molecular weight product is formed. The secondary monoamines employed in this invention are saturated or unsaturated, aliphatic, aromatic, heterocyclic, or mixed. If desired, these secondary monoamines are substituted with non-interfering adhesion-promoting substituents, such as hydroxyl groups, ether radicals, and the like. Examples of the secondary monoamines to be utilized include dimethylamine, diethylamine, methylethylamine, diisopropylamine, piperidine, toluidine, diallylamines, methylcyclohexyl amine, N-methylhydroxyl amine, methylethanolamine, butylethanolamine, N-acetylethanolamine, phenylethanolamine, and the like.

Preferred are those secondary monoamines containing hydroxyl groups such as hydroxylamines and aliphatic hydroxyl amines. Especially preferred are the dialkanolamines such as diethanolamine and diisopropanolamine. Among the dialkanolamines, diisopropanolamine is preferred over diethanolamine since the resin prepared with diisopropanolamine is less viscous than the resin prepared with diethanolamine.

Since the UV-curable resins prepared according to this invention are often very viscous, it is generally preferred to employ secondary monoamines that result in resins with reduced viscosity, generally those secondary monoamines with relatively low molecular weights. Accordingly, among secondary aliphatic monoamines, it is generally preferred to employ lower alkyl amines. It is also preferred to employ aliphatic rather than aromatic secondary monoamines.

PREPARATION OF THE PHOTOCURABLE COMPOSITION

The curable acrylate resin composition is prepared by contacting a secondary monoamine, an ethylenically unsaturated conjugated organic carboxylic acid and a polyepoxide in a ratio of between about 0.2 and about 0.9 chemical equivalents of the amine per chemical equivalent of the polyepoxide and between about 0.8 and about 0.1 chemical equivalents of the carboxylic acid per chemical equivalent of the polyepoxide, optionally in the presence of a catalyst. A preferred composition is prepared by contacting the reactants in a ratio of between about 0.2 and about 0.5 chemical equivalents of the amine per chemical equivalent of the polyepoxide and between about 0.8 and about 0.5 chemical equivalents of the carboxylic acid per chemical equivalent of the polyepoxide. A chemical equivalent amount of the polyepoxide refers to that amount needed to furnish one epoxy group per carboxyl group.

The preparation of the curable acrylate resin composition may be effected in any suitable manner. One method comprises adding the polyepoxide, acid, secondary monoamine, catalyst, and solvent or diluent, if desired, in a single step and then applying the necessary heat to initiate the reaction, after which the exothermic heat is removed. The preferred method of preparing the curable resin composition is by employing two steps. In the first step the polyepoxide is contacted with the secondary monoamine at a temperature of about 125°F to about 200°F, preferably from about 125°F to about 150°F and the reaction mixture is allowed to exotherm to a temperature of about 210°F. During this first step it is not necessary to employ a catalyst. Then the carboxylic acid is added to the mixture and the reaction mixture is maintained at a temperature of between about 210°F and about 250°F. During this second step, the amine serves as a catalyst and it is not necessary to add a separate catalyst. Alternatively, the polyepoxide is reacted first with the carboxylic acid and then with the secondary monoamine. However, when the polyepoxide is reacted first with the carboxylic acid it is necessary to add a catalyst to speed up the reaction. Nevertheless, for reasons of heat release, it may be advantageous to add the carboxylic acid first and the secondary monoamine second. After the reaction is complete, the reaction mixture is then distilled or stripped to remove any of the necessary components, such as solvents, catalyst, excess reactants and the like.

When catalysts are necessary, the preferred catalysts to be utilized in the process include the onium salts, and preferably those containing phosphorus, sulfur or nitrogen, such as, for example, the phosphonium, sulfonium and ammonium salts of inorganic acids. Examples of these catalysts include, among others, tetramethylammonium chloride or bromide (TMAC or TMAB), triphenylphosphine, ethyltriphenylphosphonium iodide or bromide, dimethylbenzyl amine, and the like, and mixtures thereof. In general, the amount of the catalyst varies from about 0.05% to about 3.0% by weight, more preferably from about 0.3% to about 2.0% by weight of the reactants.

The preparation of the curable acrylate resin composition is conducted with or without the use of solvents or diluents. In many cases, the reactants are liquid and the reaction is easily effected without the addition of solvents or diluents. However, in some cases, where either or both reactants are solids or viscous liquids, it is desirable to add an acrylate reactive diluent to assist in effecting the reaction. Examples of reactive diluents are 2-ethylhexyl acrylate, 2-hydroxyethyl acrylate, 2-hydroxypropyl acrylate, trimethylpropane triacrylate, pentaerythritol triacrylate, neopentylglycol diacrylate, 1,6-hexanediol diacrylate and the like. If solvents are employed in the reaction and the resulting product is to be used for coating purposes, the solvent is generally retained in the reaction mixture and photocured into the final film.

The reaction is preferably conducted under atmospheric pressure, but higher and lower pressures are not precluded. The course of the reaction is conveniently followed by determination of the acidity. The reaction is considered to be substantially complete when the acidity has been reduced to less than about 0.01 eq./100 grams.

Other materials may also be added to the mixtures before they are cured. These include plasticizers, stabilizers, extenders, oils, resins, tars, asphalts and the like, as well as all types of coloring or pigments to give the material the desired color. It is often useful to add a free radical inhibitor, such as hydroquinone, to the reactants prior to adding the catalyst. Oxygen must also be present during the reaction to inhibit premature gelation. For some applications, the curable acrylate resin mixture is used in admixture with unsaturated monomers, and preferably liquid monomers possessing at least one $CH_2 = C<$ group, such as styrene, alpha-methylstyrene, chlorostyrene, dichlorostyrene, vinyl naphthalene, vinyl phenol and the like; unsaturated esters, such as acrylic and methyacrylic esters, vinyl acetate and the like; halides, such as vinyl chloride and vinylidene chloride; nitriles, such as acrylonitrile and methacrylonitrile; diolefins such as butadiene, isoprene and methylpentadiene, and mixtures thereof. Acrylate esters are preferred. These monomers are preferably used in amounts varying from about 0.5% to about 90% by weight of the mixture, and preferably from about 5% to about 55% by weight.

The resin composition is cured by any conventional curing technique including the standard peroxide technique and photochemical means. Photochemical curing includes both the use of gamma radiation and ultraviolet (UV) radiation. Where it is desired to employ an ultraviolet curing system it is necessary to add a photosensitizer such as, for example, a benzoin ether or benzophenone. Typically, for ultraviolet curing it is necessary to add a combination of benzophenone and an alkyl dialkanolamine. However, according to the present invention, the tertiary amine produced during the preparation of the resin serves as co-initiator for benzophenone. Where the resin to be cured is prepared by contacting the diglycidyl ether of Bisphenol-A with acrylic acid and diisopropanolamine, it is preferred that the composition be cured by an ultraviolet curing system.

The final modified resin compositions and their above-noted mixtures with other monomers are utilized in a wide variety of different applications. They are utilized in the preparation of coatings and impregnating compositions, in the preparation of adhesives for metals, wood, cement, and the like, and in the preparation of reinforced composite products, such as laminated products, filament windings, and the like. In these latter applications, the modified resin compositions are applied to the fibrous products, such as glass fibers or sheets, and the material is then formed into the desired object. Because of their excellent adhesion to metal surfaces, the modified resin compositions of the present invention are particularly useful as metal coatings.

As shown in the Illustrative Embodiment II which follows, the photocured resin composition of the present invention has improved adhesion to metal surfaces as compared to the adhesion of a 100% acrylate resin composition. One reason for the improved adhesion is the presence of hydroxyl and amine functionalities. Another reason for the improved adhesion is that the cross link density of the photocured resin composition prepared according to the present invention is less than the cross link density of a 100% acrylate resin composition. However, if all of the acrylate portion of the resin is replaced with the secondary monoamine, the time required for photocuring is substantially increased by at least about a factor of 10. Therefore, it is preferred to replace only between about 20 and about 50 percent of the acrylate groups with the secondary monoamine groups. Further, it is preferred that there not be an excess amount of acid present in the final resin composition since otherwise an odor will be present. On the other hand, it is important to react nearly all the epoxy groups in the resin to improve the functionality of the resin.

The invention is further illustrated by means of the following Illustrative Embodiments and a Comparative Example. Note that the embodiments and example are given for the purpose of illustration only and that the invention is not be regarded as limited to any of the specific conditions or reactants recited therein.

EPON 828 Resin is employed in all embodiments and the comparative example as the polyepoxide. EPON 828 Resin is the diglycidyl ether of Bisphenol A and has an average molecular weight of between about 360 and about 380 and an epoxide equivalent weight of between about 185 and about 192.

ILLUSTRATIVE EMBODIMENT I

Preparation of 25% Modified Acrylate Resin

In Illustrative Embodiment I, 4 equivalents of EPON 828 Resin (752 grams) were contacted with 1 equivalent of diisopropanolamine (133 grams) at a temperature of about 130°F under an air sparge. The reaction mixture exothermed to a temperature of about 200°F and was then held at that temperature for about one-half hour. To this mixture was added 3 equivalents of glacial acrylic acid (216 grams) and 200 ppm hydroquinone (0.22 grams). The reaction mixture exothermed to about 250°F and was held at that temperature for about one and one-half hours until the acidity had fallen below about 0.01 eq./100 grams. The final resin composition had an acidity of 0.0076 eq./100 grams and a Gardner color of 7.

COMPARATIVE EXAMPLE I

Preparation of Unmodified Acrylate Resin

One equivalent each of EPON 828 Resin (188 grams) and glacial acrylic acid (72 grams) were heated to 200°F under an air sparge in the presence of 220 ppm hydroquinone (0.052 grams). Then 0.7% of 50% aqueous tetramethylammonium chloride catalyst was added (1.82 grams). The reaction was allowed to exotherm to 240°–250°F, whereupon cooling was initiated to hold the temperature in that range. After 2 hours, 45 minutes, the acidity had fallen below 0.01 eq./100 g, the mixture was cooled to 170°F and removed.

ILLUSTRATIVE EMBODIMENT II

The resin compositions prepared in Illustrative Embodiment I, and in Comparative Example I were photocured by adding 30% 2-hydroxypropyl acrylate diluent and 5 phr Trigonal 14 photoinitiator to the resin, coating "Q" Steel panels with the resin mixture at 0.2–0.3 mil film thickness, and subjecting the coated panels to an ultraviolet lamp of 200 watts per linear inch at a line speed of 200 feet per minute. The degree of cure and adhesion to metal surfaces were measured by two standard tests employed by the paint and coating industry - MEK Rubs and Scotch Tape Adhesion, respectively. Some of UV-cured panels were pasteurized for 45 minutes in water at 160°F prior to testing. Adhesion was retained after pasterization. The results are shown below in Table I:

TABLE I

| Resin | UV Cured MEK Rubs | UV Cured Scotch Tape* Adhesion | UV Cured - Pasteurized MEK Rubs | UV Cured - Pasteurized Scotch Tape* Adhesion |
|---|---|---|---|---|
| 1) 100% Acrylate (C.e. I) | 54 | 0 | 100 | 0 |
| 2) 25% DIPA (I.E. I) | 9 | 10 | 14 | 10 |

*0 = Poor
10 = Excellent

We claim as our invention:

1. An ultraviolet curable acrylate resin composition with improved adhesion to metal surfaces consisting essentially of a reaction product of (i) a secondary monoamine selected from the group consisting of dimethylamine, diethylamine, methylethylamine, diisopropylamine, piperidine, toluidine, diallylamines, methylcyclohexyl amine, N-methyhydroxyl amine, methylethanolamine, butylethanolamine, N-acetylethanolamine and phenylethanolamine, (ii) acrylic acid and (iii) a polyepoxide in a ratio of between about 0.2 and about 0.9 chemical equivalents of the monoamine per chemical equivalent of the polyepoxide and between about 0.8 and about 0.1 chemical equivalents of the acrylic acid per chemical equivalent of the polyepoxide wherein said polyepoxide is a glycidyl ether of 2,2-bis(4-hydroxyphenyl)propane and wherein said reaction product is prepared by contacting components (i), (ii) and (iii) at reaction temperatures of about 125°F to about 200°F.

2. A composition according to claim 1 wherein the composition consists essentially of said secondary monoamine, (ii) said acrylic acid and (iii) said polyepoxide in a ratio of between about 0.2 and about 0.5 chemical equivalents of the monoamine per chemical equivalent of the polyepoxide and between about 0.8 and about 0.5 chemical equivalents of the acrylic acid per chemical equivalent of the polyepoxide.

3. A composition according to claim 2 wherein said secondary monoamine is diisopropanolamine.

4. The method of preparing an ultraviolet curable acrylate resin composition having improved adhesion to metal surfaces which comprises contacting in a reactor at a temperature of between about 125°F to about 200°F and in the absence of additional catalysts (i) a secondary monoamine selected from the group consisting of dimethylamine, diethylamine, methylethylamine, diisopropylamine, piperidine, toluidine, diallylamines, methylcyclohexyl amine, N-methylhydroxyl amine, methylethanolamine, butylethanolamine, N-acetylethanolamine and phenylethanolamine, (ii) acrylic acid and (iii) a polyepoxide in a ratio of between about 0.2 and about 0.9 chemical equivalents of the monoamine per chemical equivalent of the polyepoxide and between about 0.8 and about 0.1 chemical equivalents of the acrylic acid per chemical equivalent of the polyepoxide wherein said polyepoxide is a glycidyl ether of 2,2-bis(4-hydroxyphenyl)propane and wherein said polyepoxide is contacted first with said secondary monoamine and then with said acrylic acid.

5. The method according to claim 4 which comprises contacting (i) said secondary monoamine, (ii) said acrylic acid and (iii) said polyepoxide in a ratio of between about 0.2 and about 0.5 chemical equivalents of the monoamine per chemical equivalent of the polyepoxide and between about 0.8 and about 0.5 chemical equivalents of the acrylic acid per chemical equivalent of the polyepoxide.

6. The method according to claim 5 wherein said secondary monoamine is diisopropanolamine.

* * * * *